Dec. 8, 1942.                H. PURAT                2,304,121
                         WELDING MECHANISM
                        Filed Dec. 13, 1940         2 Sheets-Sheet 1
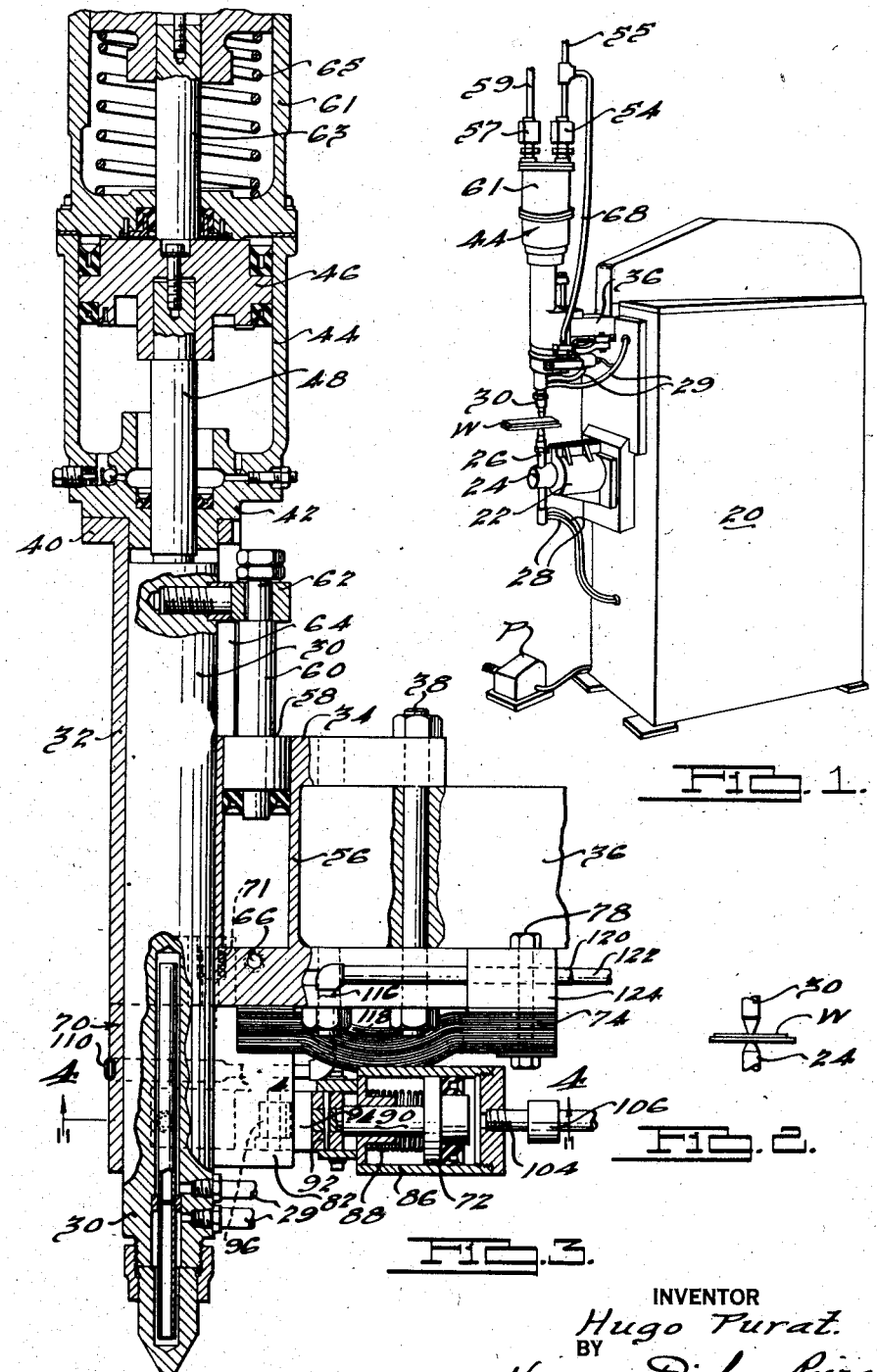
INVENTOR
Hugo Purat.
BY
Harness, Dickey & Pierce.
ATTORNEYS.

Dec. 8, 1942.    H. PURAT    2,304,121
WELDING MECHANISM
Filed Dec. 13, 1940    2 Sheets-Sheet 2

INVENTOR
Hugo Purat.
BY
Harness, Dickey & Pierce.
ATTORNEYS.

Patented Dec. 8, 1942

2,304,121

UNITED STATES PATENT OFFICE 2,304,121

WELDING MECHANISM

Hugo Purat, Detroit, Mich., assignor to Progressive Welder Company, Detroit, Mich., a corporation of Michigan Application December 13, 1940, Serial No. 370,050

13 Claims. (Cl. 219—4)

The present invention relates to welding machines, and, in its illustrated form, provides an improved electrode supporting structure for a spot welding machine.

The principal objects of the present invention are to provide a structure of the above character which is simple in operation; to provide such a structure which is readily adjustable to accommodate work of different thicknesses and sizes; to provide such a structure embodying means to support an electrode for movement between retracted and work engaging positions, and embodying a cooperating member which is releasably engageable with the electrode to electrically connect the electrode to a source of welding current; to provide such a structure in which the electrode and the releasable member are carried by a conducting support common thereto; to provide such a structure embodying an improved cooling arrangement; and to generally improve the construction and operation of welding structures.

With the above, as well as other and more detailed objects in view, which appear in the following description and in the appended claims, a preferred embodiment of the invention is described in the following specification and shown in the accompanying drawings, throughout the several views of which corresponding reference characters are used to designate corresponding parts and in which:

Figure 1 is a view in perspective of a preferred machine, which may be used to practice the invention;

Fig. 2 is a fragmentary view, showing the electrodes of Fig. 1 in clamping engagement with the work;

Fig. 3 is a view in longitudinal section of the movable electrode and its actuating and connecting structure;

Figure 4:
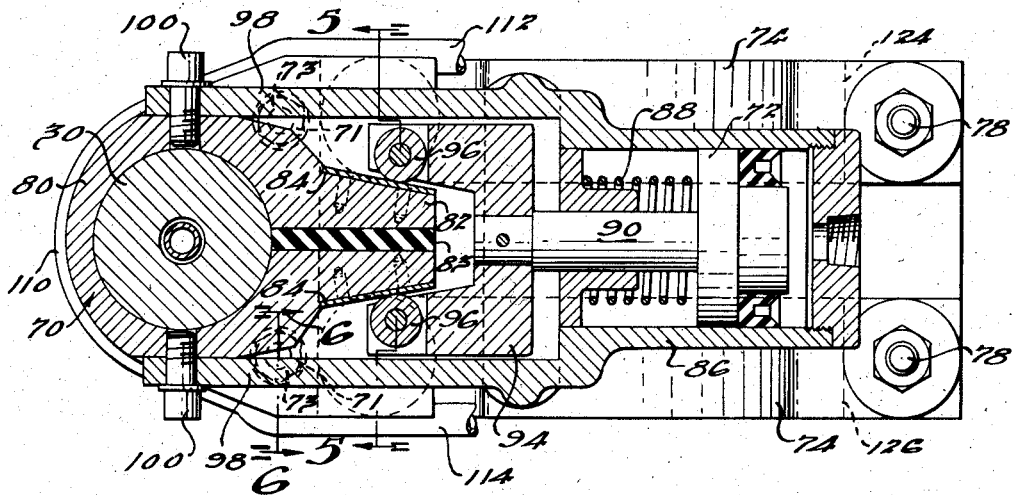
Fig. 4 is a view in horizontal section, taken along the line 4—4 of Fig. 3.
Figures 5, 6:
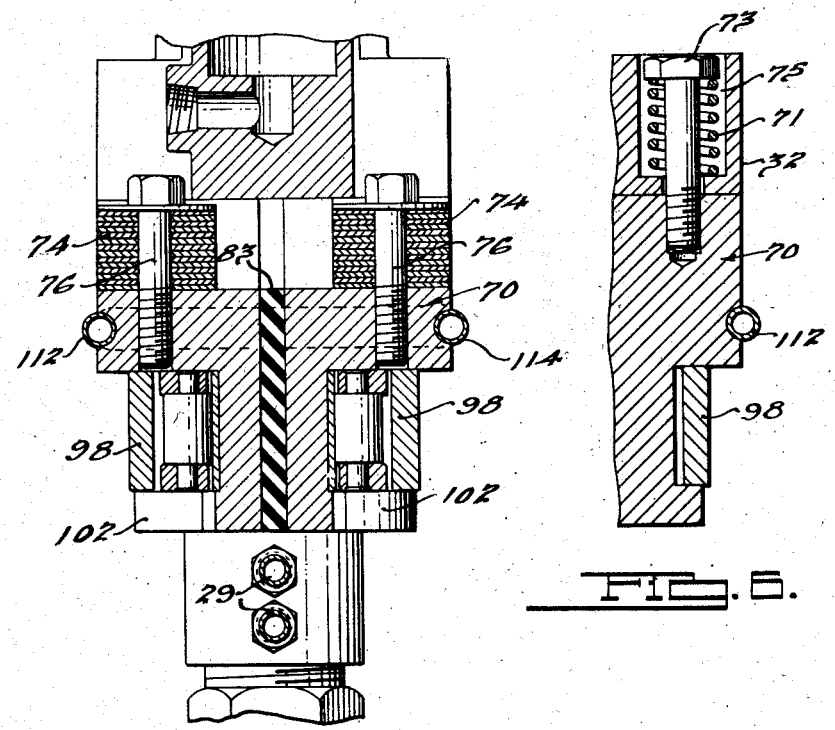
Fig. 5 is a view in vertical section, taken along the line 5—5 of Fig. 4.
Fig. 6 is a fragmentary view in section, taken along the line 6—6 of Fig. 4.

It will be appreciated from a complete understanding of the present invention that the same may be embodied in machines of widely differing types, the herein disclosed machine being shown in an illustrative but not in a limiting sense. Also, while being of particular utility in connection with spot welding machines, the present invention is, in a generic sense, applicable to other classes of welding.

Referring to Figs. 1 through 6, the present welding machine comprises a frame structure, designated generally as 20, having a tubular support 22 projecting from the forward face thereof, which support carries a holder 24 for the relatively stationary electrode 26. It will be understood that the holder 24 is axially adjustable within the support and the electrode 26 is vertically adjustable within the holder 24. Also, the electrode 26 may be electrically connected, through the holder 24, to one secondary lead of a suitable transformer (not shown), which may be housed within the frame 20. As illustrated, the electrode 26 is of the water-cooled type, and illustrative fluid lines 28 extend from suitable circulating structure (not shown) within the frame 20 to the electrode 26. Similar cooling conduits 29 are provided for the movable electrode 30.

The movable electrode 30 is vertically reciprocable between the retracted position, shown in Fig. 1, and the clamped position, shown in Fig. 2, within a sleeve 32, which sleeve is either formed integrally with or is rigidly secured to a U-shaped bracket 34, which receives between the legs thereof, a conducting support 36. The support 36 is suitably supported by the machine frame 20 and may be conventionally adjustable inwardly and outwardly of the machine frame. Also, the support 36 may be provided, within the machine frame 20, with suitable connections to the other secondary terminal of the previously mentioned transformer. The bracket 34 is rigidly but removably secured to the support 36 by means of one or more bolts 38, which pass through the support 36 and also through the upper and lower legs of the bracket 34.

The upper end of the sleeve 32 is flanged, as indicated at 40, to provide a seat for the lower end 42 of a fluid pressure operated ram 44, which may be actuated either by hydraulic pressure or by a compressible fluid pressure, air being a preferred operating medium. The ram 44 slidably receives a piston 46, the piston rod 48 whereof projects outwardly from the lower end of the ram 44 and normally freely abuts the upper end of the cylindrical electrode 30. In accordance with the arrangement disclosed in application Serial No. 349,947, filed August 2, 1940, by Howard H. Dally, and assigned to the assignee hereof, fluid pressure may be introduced into and exhausted from the ram 44, under the control of a usual solenoid operated valve 54, it being understood that in the de-energized position of this valve, it connects the ram to exhaust and in the energized position thereof, it closes the exhaust connection and connects the ram to a source of fluid pressure, designated 55 in Fig. 1.

In order to normally bias the electrode 30, and consequently the ram piston, to the illustrated upper position, the auxiliary cylinder 56 is provided. This cylinder is illustrated as being formed integrally with the bracket 34 and slidably receives a piston 58, the piston rod 60 whereof is provided with a crosshead 62. The crosshead 62 projects through a slot 64 formed in the back of the sleeve 32, and is rigidly connected to the movable electrode 30. The cylinder 56 is provided with an inlet and exhaust port 66, which continuously communicates, through the line 68 (Fig. 1), with the source 55 of fluid pressure.

It will be understood that when the valve 54 is actuated to connect the ram 44 to the source of fluid pressure, the piston 46 forces the electrode 30 downwardly into clamping engagement with the work W against the opposing force of the piston 58, the differential pressure thus exerted against the electrode 30 being determined by the relative areas of the pistons 46 and 58, and being further adjustable, as will be understood, by the use of suitable metering or other valves interposed between the rams 44 and 56, respectively, and the source of fluid pressure. Upon de-energizing the valve 54, the pressure is relieved from the piston 46 without, however, interrupting the fluid pressure applied to the piston 58, which thereupon becomes effective to elevate the electrode 30 from the position shown in Fig. 2 to the position shown in Figs. 1 and 3.

As is described in said Dally application, it is preferred in certain instances to provide for a variation in pressure during the welding cycle, and this variation is afforded, in the present structure, by employing an auxiliary ram 61, in further accordance with the disclosure of said Dally application. As is disclosed in more detail in the Dally application, the ram 44 is surmounted by the ram 61, the piston rod 63 whereof projects through the otherwise closed lower end of the ram 61, and directly engages the piston 46 of the ram 44. The ram 61 may be and preferably is provided with a return spring 65, and is also provided with a solenoid operated control valve 57, which communicates with a source 59 of fluid pressure. The source 59 may, if desired, be arranged to afford the same or a different pressure than is afforded by the line 55. It will be understood that in the de-energized position, the valve 57 connects the ram 61 to exhaust and, in the energized position, closes the exhaust connection and connects the ram 61 to the source 59. The timing control system may be arranged to provide for operating the valves 54 and 57 together or in proper sequence, so as to provide the proper pressure sequence, and may further be arranged to eliminate the ram 61 from the system and employ only the relatively low pressure afforded by the ram 44. One such control system is disclosed in the Chester F. Leathers application, Serial No. 365,321, filed November 12, 1940, and assigned to the assignee hereof and in the Cletus J. Collom application, Serial No. 369,760, filed December 12, 1940, and assigned to the Weltronic Corporation.

In the present construction, the electrical connection between the previously identified conducting support 36 and the movable electrode 30 is made through a clamping bracket 70, which surrounds the lower end of the cylindrical electrode 30, and is actuable by means of the piston 72 between a released position, in which it freely allows the previously described vertical movements of the electrode 30, and a clamped position, in which it forms a substantially continuous connection between the electrode 30 and the support 36. The bracket 70 is electrically connected to the support 36, through the bracket 34, by means of a pair of laterally spaced, flexible, laminated bus bars 74. The outer end of each bus bar 74 is connected by means of a stud 76 to the bracket 70, and the inner end of each bus bar is correspondingly connected by a stud 78 to the lower leg of the previously mentioned member 34. The laminated bus bars 74 give some vertical support to the clamping bracket 70, but it is preferred to supplement this support by a pair of supporting springs 71, one of which is shown in detail in Fig. 6. The springs 71 are respectively received in counterbores 75 formed in bosses at the respectively opposite sides of the sleeve 32. One end of each spring bears against the base of the associated counterbore, and the other end thereof bears against the head of a stud 73, which is threaded into the body of the clamping bracket 70. With this relation, the springs 71 are effective to yieldingly hold the clamping bracket 70 in abutting relation to the lower end of the sleeve 32.

The bracket 70 comprises a central body portion 80, which is best shown in Fig. 4, and embraces the movable electrode 30. It also comprises a pair of spaced apart legs 82, the respectively outer faces whereof are of wedge form, and are preferably provided with wear plates 84. The legs 82 and the connecting body portion 80 are sufficiently spring-like, so that upon release of the piston 72, as described below, the body 80 expands sufficiently to release the electrode 30. Preferably and as illustrated, however, this releasing movement is accelerated by introducing a compressible rubber pad 83 between the legs 82, which pad is compressed when the legs 82 are forced together and which, upon release of the piston 72, becomes effective to assist in spreading the legs 82 and releasing the electrode 30 from the clamp.

The piston 72 is slidably received in a cylinder 86 and is provided with a compression spring 88, which normally urges the piston 72 to the right-hand position, shown in Figs. 3 and 4. The piston rod 90, associated with the piston 72, projects outwardly from the cylinder 86, and is connected by means of a drive pin 92 to a yoke 94, the forwardly projecting legs whereof are each provided with a roller 96 for cooperation with the previously mentioned wedge faces of the bracket 70. The cylinder 86 is provided with integral, forwardly projecting legs 98, which are rigidly connected at their extreme ends to the bracket 70, by means of pins 100. The end portions of the legs 98 are received in notches provided therefor in the sides of the clamping bracket 70, the lower surfaces 102 whereof afford additional support for such legs.

It will be appreciated from the foregoing description that the welding current passes directly through the clamping bracket 70, and also passes through the bracket 34, the principal part of such current flow being confined, however, to the lower leg of the bracket 34. In further accordance with the present invention, the brackets 34 and 70 are provided with a cooling circuit, and for this purpose, the periphery of the body portion of the bracket 70 is grooved, and a flexible conduit 110 is secured in this groove. The ends 112 and 114 of the conduit 110 are connected, respectively, by flexible portions 116 and 118, to conduits 120 and 122. The conduits 120 and 122 are secured in grooves provided in the respectively opposite faces of the lower leg of the bracket 34. Such lower leg is provided with lateral projections 124 and 126 at the respectively opposite sides thereof, which receive the previously identified studs 78; and these projections are provided with bores through which the conduits 120 and 122 are passed. It will be understood that the conduits 120 and 122 lead to the previously identified source of cooling liquid (not shown), which may be located within the frame 20.

As to operation, the resilience of the bracket 70, together with the action of the pad 83, yieldingly urges the legs 82 far enough apart to release the electrode 30 for free vertical movement with respect to the bracket. Under normal conditions, also, the piston 72 is retained in its right-hand position by means of the compression spring 88. Preparatory to making a weld, and after the ram 44 has been actuated to move the electrode 30 downwardly to the active position of Fig. 2, fluid pressure is applied, through the port 104 to the piston 72, which thereupon forces the yoke 94 to the left, enabling the rollers 96 to contract the legs 82 and cause the body of the bracket 70 to clamp the electrode 30. It will be understood that the passage through the work of the welding current enables the continuous pressure applied by the ram 44 to slightly compress the work, during which compression the electrode 30 moves downwardly by an amount equal to the degree of compression of the work. This degree of compression is relatively slight, and the required amount of downward movement of the bracket 70 is permitted by the flexible character of the bus bars 74. At the conclusion of the flow of welding current, the valve 106 (Fig. 3), which controls the passage 104 leading to the cylinder 86, is de-energized, connecting this cylinder to exhaust, and enabling the compression spring 88 to return the piston 72 to the illustrated righthand position. This return movement of the piston is also aided by the resilience of the legs 82 of the clamping bracket 70 and the pad 83. Thus, upon relief of the pressure in the cylinder 86, the legs 82 expand sufficiently to free the movable electrode 30.

After the conclusion of the flow of welding current, also, the actuating pressure on the electrode 30 is released, enabling it to return to the position of Fig. 1, under the influence of the ram 56. As will be understood, this may be accomplished by restoring valves 54 and 57 to the de-energized condition, which action is usually timed to occur at the expiration of the usual "hold time" interval, and in all instances is preferably timed to occur after the release of the clamping bracket 70.

More specifically, the operations afforded by the timing control system of the aforesaid Leathers and Collom applications are as follows.

Assuming it is desired to effect a welding operation, it will be appreciated that the workpieces in question may be interposed between the electrodes 26 and 30, and that thereafter the usual foot treadle or pilot switch, designated P in Fig. 1, may be depressed. This action causes completion of a circuit for the winding of the air valve 57. Upon being energized, the valve 57 connects the ram 61 to the source 59 of relatively high fluid pressure, thereby actuating the piston rod 63 to move the electrode 30 downwardly into its active position, clamping the two workpieces between the electrodes 26 and 30. The relatively high pressure employed at this stage of the welding cycle is sufficient to force the engaging surfaces of the two workpieces firmly together, preparatory to the actual making of the weld. As will be evident, the construction of the machine is such that the line of force is substantially coincident with the axes of the electrodes 26 and 30, so that any tendency of these electrodes to cock the work is eliminated.

After a predetermined period, following the actuation of ram 61, the previously completed circuit for the high pressure valve 57 is interrupted, which thereupon relieves the pressure from the auxiliary ram 61. At this time, also, energizing circuits are completed for the valve 54, associated with the low pressure ram 44, and the valve 106, associated with the clamping ram 86.

The energization of valve 54 applies a relatively lower or welding pressure to the electrodes 30 and 26, through the piston 46 of the ram 44, and it will be understood that valve 54 may be timed to operate and apply such lower or welding pressure before the pressure in the ram 61 has fallen to a value lower than the value of the welding pressure. Thus, the change from the initial high pressure to the welding pressure is effected without reducing the pressure between the electrodes to a value lower than the welding pressure.

The energization of the clamping valve 106 applies pressure to the piston 72, associated with the cylinder 86, which thereupon clamps the clamping bracket 70 around the movable electrode 30, thus completing the secondary circuit of the welding transformer, preparatory to the actual initiation of the welding current. Thereafter, the transformer (not shown) is actuated to pass the welding current through the electrodes 26 and 30 and, after a predetermined period of flow, is deenergized. After such de-energization of the transformer, the control system functions to de-energize the low pressure valve 54, associated with the ram 44; to also de-energize the valve 106, associated with the clamping cylinder 86, which thereupon releases the clamping bracket 70; and to further recomplete the circuit for the valve 57, associated with the high pressure ram 61. It will be understood, as before, that the timing of these valve actions is such that the high pressure ram is enabled to build up its pressure at least as rapidly as the low pressure is dissipated from the low pressure ram, so that at this stage, the electrode pressure does not fall below the lower or welding value.

At the expiration of a predetermined "hold time," following the release of the clamping bracket 70, the circuit for the high pressure valve 57 is interrupted, which thereupon relieves the pressure in the ram 61 and enables the originally built up return pressure in the small cylinder 56 (Fig. 3) to restore the movable electrode 30 to the illustrated upper position, thereby completing the welding cycle.

As aforesaid, there are certain instances in which the entire welding operation can be performed without providing the above discussed variation in the pressure between the electrodes. In such instances, suitable means may be provided to eliminate the high pressure valve 57 from the system. Under such circumstances, accordingly, the closure of the pilot switch first energizes the low pressure ram 44, thereafter energizes the clamping valve 106 and thereafter, as before, produces the welding cycle. At the conclusion of the flow of welding current, the clamping valve 106 is first released, and thereafter, at the expiration of the "hold time," ram 44 is released, completing the cycle.

It will be appreciated that various modifications in the form, number and arrangement of parts may be made without departing from the spirit and scope of the invention and that the herein described embodiment of the invention is to be regarded in an illustrative and not in a limiting sense.

What is claimed is:

1. In a welder, the combination of a movable electrode having a conductive surface, means for moving the same into engaging relation to the work, and means for supporting and for completing an electrical circuit to the electrode comprising a member having a conductive surface complemental in form to and releasably engageable with the said electrode surface.

2. In a welder, the combination of a movable electrode, means for supporting and moving the same into engaging relation to the work, a conducting member releasably engageable with the electrode, and means comprising a flexible conductor for completing an electrical circuit through said conducting member to the electrode.

3. In a welder, the combination of a supporting member, an electrode carried thereby for movement relative thereto between work engaging and retracted positions, and a conducting member releasably engageable with the electrode and carried by said supporting member, said conducting member serving when engaged with said electrode to connect the same to a source of current.

4. In a welder, the combination of a conducting support, an electrode movably mounted on said support for movement relative thereto between work engaging and retracted positions, a conducting member releasably engageable with the electrode, and means for electrically connecting said conducting member to said support.

5. In a welder, the combination of a conducting support, an electrode movably mounted on said support for movement between work engaging and retracted positions, a conducting member releasably engageable with the electrode, means for electrically connecting said conducting member to said support, and means serving to support said conducting member from said support.

6. In a welder, the combination of a conducting support, an electrode mounted on said support for movement relative thereto beteween work engaging and retracted positions, a conducting member releasably engageable with the electrode, and a flexible conductor for electrically connecting said conducting member to said supporting member.

7. In a welder, the combination of a conducting support, an electrode movably mounted on said support for movement between work engaging and retracted positions, a conducting member releasably engageable with the electrode, and a flexible conductor for electrically connecting said conducting member to said supporting member, and means providing a supporting connection between said conducting member and said supporting member.

8. In a welder, the combination of a conducting support, a movable electrode and actuating means therefor carried by said support, said actuating means being operable to move said electrode between work engaging and retracted positions, a conducting member releasably engageable with the electrode, and means comprising a flexible conductor for supporting said conducting member and for electrically connecting the same to said first-mentioned support.

9. In a welder, the combination of a conducting support, a movable electrode and actuating means therefor carried by said support, said actuating means being operable to move said electrode between work engaging and retracted positions, a conducting clamp embracing said electrode, means for contracting said clamp into engagement with the electrode, and means for electrically connecting said clamp to said first-mentioned support.

10. In a welder, the combination of a conducting support, a movable electrode and actuating means therefor carried by said support, said actuating means being operable to move said electrode between work engaging and retracted positions, a conducting clamp embracing said electrode, means for contracting said clamp into engagement with the electrode, and means comprising a flexible conductor for electrically connecting said clamp to said first-mentioned support.

11. In a welder, the combination of a movable electrode, a conducting clamp embracing said electrode, and means for contracting said clamp into engagement with the electrode, said clamp being formed to expand upon release of said means so as to permit relative movement between said electrode and the clamp.

12. In a welder, the combination of an electrode, a conducting clamp embracing said electrode and having spaced legs extending laterally therefrom, wedging means cooperating with said legs to contract the clamp into engagement with the electrode, and means for actuating said wedging means, said clamp being formed to expand upon release of said actuating means.

13. In a welder, the combination of a movable electrode, means for moving the same into engaging relation to the work, and means for completing an electrical circuit to the electrode comprising a conducting member releasably engageable with the electrode, and flexible conducting means connected to said conducting member.

HUGO PURAT.

CERTIFICATE OF CORRECTION.

Patent No. 2,304,121. December 8, 1942.

HUGO PURAT.

It is hereby certified that error appears in the printed specification of the above numbered patent requiring correction as follows: Page 4, first column, line 19, claim 1, strike out the words "for supporting and" and insert the same after "means" in line 17, same claim; and that the said Letters Patent should be read with this correction therein that the same may conform to the record of the case in the Patent Office.

Signed and sealed this 2nd day of March, A. D. 1943.

(Seal)
Henry Van Arsdale,
Acting Commissioner of Patents.